United States Patent
North et al.

(10) Patent No.: US 11,136,781 B1
(45) Date of Patent: Oct. 5, 2021

(54) CONTAINER ASSEMBLY SYSTEMS AND METHODS AND COMBINATION OF CONTAINER ASSEMBLY AND WEIGHT MATERIAL ASSEMBLY FOR STABILIZING OBJECTS

(71) Applicant: Premier Tents, Inc., Bellingham, WA (US)

(72) Inventors: Robert Wallace North, Bellingham, WA (US); Paula Kay North, Bellingham, WA (US)

(73) Assignee: Premier Tents, Inc., Bellingham, WA (US)

( * ) Notice: Subject to any disclaimer, the term of this patent is extended or adjusted under 35 U.S.C. 154(b) by 0 days.

(21) Appl. No.: 16/843,290

(22) Filed: Apr. 8, 2020

(51) Int. Cl.
  F16M 13/00 (2006.01)
  E04H 12/22 (2006.01)
  A47B 97/00 (2006.01)
  A47B 91/12 (2006.01)
  A45B 23/00 (2006.01)
  F16B 1/00 (2006.01)

(52) U.S. Cl.
  CPC ......... *E04H 12/2246* (2013.01); *A47B 91/12* (2013.01); *A47B 97/00* (2013.01); *F16M 13/00* (2013.01); *A45B 23/00* (2013.01); *A45B 2023/0012* (2013.01); *A47B 2097/008* (2013.01); *F16B 1/00* (2013.01); *F16B 2001/0028* (2013.01); *F16M 2200/08* (2013.01)

(58) Field of Classification Search
  CPC combination set(s) only.
  See application file for complete search history.

(56) References Cited

U.S. PATENT DOCUMENTS 2,806,131 A * 9/1957 Palmer ............ E01F 9/654
  362/186
3,216,681 A 11/1965 Paolo
  (Continued)

OTHER PUBLICATIONS

Premier Tents, Premier Tents Generation 1 Square Umbrella Stand Weight Bag ("Gen1 Square"); first produced around 2005 and depicted in a Sep. 15, 2014 Youtube Video available at https://www.youtube.com/watch?v=8c4Qn1nHELk, 11 pages.

(Continued)

*Primary Examiner* — Monica E Millner
(74) *Attorney, Agent, or Firm* — Michael R. Schacht; Schacht Law Office, Inc.

(57) ABSTRACT

A weight system for supporting a free-standing object comprising a weight material assembly and a container assembly. The container assembly comprises a panel assembly defining an interior chamber, an access opening, and an access flap and a closure system operable in an open configuration in which the access flap may be displaced between closed and open positions and a closed configuration in which the access flap is secured in the closed position. The interior chamber is sized and dimensioned to accommodate predetermined dimensions of the weight material assembly. The access opening is sized and dimensioned to allow the weight material assembly to be displaced through the access opening and into the interior chamber. The weight material assembly is arranged within the interior chamber with the panel assembly configured in the closed position and the closure system operated in the closed configuration.

20 Claims, 13 Drawing Sheets

(56) References Cited

U.S. PATENT DOCUMENTS

| | | | |
|---|---|---|---|
| 4,296,693 A | 10/1981 | Archer | |
| 4,486,016 A | 12/1984 | Rubin | |
| 4,606,524 A * | 8/1986 | Conee | F16M 13/022 |
| | | | 248/346.06 |
| 4,832,163 A | 5/1989 | Levesque | |
| 4,924,893 A * | 5/1990 | Furey | A45B 23/00 |
| | | | 135/16 |
| 5,169,111 A | 12/1992 | Dunaj | |
| 5,207,406 A * | 5/1993 | Stine | A45B 17/00 |
| | | | 135/99 |
| 5,354,031 A * | 10/1994 | Bilotti | E04H 12/2238 |
| | | | 248/511 |
| 5,427,346 A * | 6/1995 | Urgola | A45C 9/00 |
| | | | 135/16 |
| 5,452,877 A | 9/1995 | Riffle et al. | |
| 6,554,012 B2 | 4/2003 | Patarra | |
| 6,565,459 B2 * | 5/2003 | Gormley | E04H 12/2246 |
| | | | 108/161 |
| 6,889,953 B2 | 5/2005 | Harbaugh | |
| 6,986,496 B2 | 1/2006 | Woude | |
| 7,216,839 B2 * | 5/2007 | Xiaoqiu | E04H 12/2246 |
| | | | 248/346.2 |
| 8,047,217 B1 | 11/2011 | Schermerhorn, Jr. | |
| 8,556,141 B1 | 10/2013 | Ferraiolo | |
| 8,783,274 B1 | 7/2014 | Supino | |
| 8,789,549 B1 | 7/2014 | Barnes | |
| 8,931,749 B2 | 1/2015 | Vetesnik | |
| 9,540,840 B2 | 1/2017 | Ma | |
| 9,974,369 B1 * | 5/2018 | DePaolo | A45B 23/00 |
| 10,087,647 B2 | 10/2018 | North et al. | |
| 10,151,121 B2 | 12/2018 | North et al. | |
| 10,472,846 B2 | 11/2019 | North et al. | |
| 10,508,465 B2 * | 12/2019 | Pan | E04H 12/2246 |
| 10,633,882 B2 | 4/2020 | North et al. | |
| D919,282 S | 5/2021 | Chen et al. | |
| D919,955 S | 5/2021 | Chen et al. | |
| 2002/0185582 A1 * | 12/2002 | Li | E04H 12/2238 |
| | | | 248/522 |
| 2004/0069922 A1 | 4/2004 | Wu | |
| 2005/0189005 A1 * | 9/2005 | Smith | G09F 23/00 |
| | | | 135/16 |
| 2012/0011773 A1 | 1/2012 | Cross et al. | |
| 2013/0092283 A1 | 4/2013 | Votel et al. | |
| 2013/0146739 A1 * | 6/2013 | Zhao | E04H 12/2246 |
| | | | 248/519 |
| 2015/0090307 A1 | 4/2015 | Supino | |
| 2015/0159394 A1 | 6/2015 | Oliveira | |
| 2015/0320161 A1 | 11/2015 | Perry | |
| 2015/0330613 A1 | 11/2015 | Louden | |
| 2017/0101799 A1 | 4/2017 | Koerner | |
| 2017/0101800 A1 | 4/2017 | North et al. | |
| 2017/0130481 A1 | 5/2017 | Pozybill | |
| 2017/0183887 A1 | 6/2017 | North et al. | |
| 2019/0119939 A1 | 4/2019 | North et al. | |
| 2020/0048924 A1 | 2/2020 | North et al. | |
| 2020/0256080 A1 | 8/2020 | North et al. | |

OTHER PUBLICATIONS

ShadeMobile, RU22-6000 Rolling Umbrella Base ("ShadeMobile"); on sale prior to 2016. The base is depicted in a Jan. 5, 2012 YouTube video. URL=https://www.youtube.com/watch?v=W_0TXr8B3BA, 2 pages.
Premier Tents Generation 1 Square Umbrella Stand Weight Bag ("Gen1 Square"), 12 pages.
Premier Tents Generation 1 Round Umbrella Stand Weight Bag ("Gen1 Round"), 8 pages.
Nikou Round Water Weight Bag ("Nikou"), 11 pages.
LB International 32 Offset Outdoor Patio Umbrella Base ("LB International"), 5 pages.
ShadeMobile RU22-6000 Rolling Umbrella Base ("ShadeMobile"), 4 pages.
Patio Living Concepts 261 Unweighted Umbrella Stand ("Patio Living"), 5 pages.
TradeMark Innovations Synthetic Fiber Saddlebag ("TradeMark Innovations"), 6 pages.
Westin Furniture 4-Piece Universal Cross Brace Umbrella Weights ("Westin"), 4 pages.
Oakland Living Polyresin Free-Standing Umbrella Stand ("Oakland"), 13 pages.
Oxford Garden 40-lb. Market Patio Umbrella Stand ("Oxford"), 6 pages.
Treasure Garden Videos, 50lb Market Base and 30lb Add-on Weight, https://www.youtube.com/watch?v=-_W5J3pNzPo, Jun. 16, 2011, 1 page.
Instant Shade Umbrella, Aurora Umbrella Weighted Base Assembly 1080p, https://www.youtube.com/watch?v=zLALNAQoXfk, Jun. 30, 2015, 1 page.
Authenteak Outdoor Living, 0lb Market Base and Add-on Weight, https://www.youtube.com/watch?v=cOE0Qk4VxY8&list=PL2mjuUN2QMkoyPblKNdzaZYv8F0QILtUV, 1 page.
Backyard City, Beach Umbrella and Fishing Anchors, https://www.youtube.com/watch?v=YtNjixABxyc, Feb. 2, 2012, 1 page.
Peggi G, How to make an outdoor umbrella stand, https://www.youtube.com/watch?v=6Qz0G-tYMeU, Aug. 4, 2014, 1 page.
Concrete Exchange, Make a Concrete Umbrella Stand from an Ikea Lamp Shade, https://www.youtube.com/watch?v=IZ9lhbMWMng, Mar. 28, 2013, 1 page.
The Orange Door, Umbrella Stand Flower Bed, http://theorangedoor-debrasdish.blogspot.com/2014/04/umbrella-stand-flower-bed.html, 2 pages.
Freeport Park, Alapaha Resin Free Standing Umbrella Base, https://www.wayfair.com/outdoor/pdp/freeport-park-alapaha-resin-free-standing-umbrella-base-w000167187.html?piid=, 5 pages.
Verified Mom, How to create a unique DIY umbrella stand!, https://www.verifiedmom.com/how-to-create-a-unique-diy-umbrella-stand/?v=32aec8db952d, 9 pages.
Jadeflower, Made in the Shade—a unique planter pot Umbrella Stand, https://jadeflower.wordpress.com/2011/07/01/made-in-the-shade-a-unique-planter-pot-umbrella-stand/, Jul. 1, 2011, 11 pages.
Firebuilt Umbrellas, 55 lb. Concrete Patio Umbrella Base in Black, https://www.homedepot.com/p/Fiberbuilt-Umbrellas-55-lb-Concrete-Patio-Umbrella-Base-in-Black-CB19K/203018451, 6 pages.
Gardenista, DIY: Rock Weights for a Sun Shade, https://www.gardenista.com/posts/diy-rock-weights-for-a-sun-shade/, Jun. 2, 2020, 6 pages.
Lynda Makara, Get rid of gophers with a gopher fence, https://lyndamakara.com/category/home-garden/landscaping/, Jun. 16, 2016, 46 pages.
Darby Home Co, Windell 11' Cantilever Umbrella, 2 pages.
Everything Backyard, DIY Patio Umbrella Stand: 4 Suggestions, https://everythingbackyard.net/diy-patio-umbrella-stand/, 13 pages.
Cobana, Plastic Patio Umbrella Sand Filled Base, https://www.farmgardensuperstore.com/product/cobana-offset-patio-umbrella-base-sand-filled-set-pack-of-4-square/, 2 pages.
Corliving, Patio Umbrella Base Weights, https://www.homedepot.ca/product/corliving-patio-umbrella-base-weights/1001041748, 5 pages.
CBONER, Cell Phonea8, https://www.amazon.com/umbrella-resistant-searching-portable-feeders/dp/B00CGE3ZI2?SubscriptionId=AKIAJM4NKIQGABP2PIRA&tag=thewire06-20&linkCode=xm2&camp=2025&creative=165953&creativeASIN=B00CGE3ZI2&ascsubtag=WC31783, 7 pages.
Jennifer Perkins, Trendy Stenciled Cinderblock Pool Umbrella Weight and Planter, https://jenniferperkins.com/stenciled-cinderblock-pool-umbrella-weight-diy/, 21 pages.
US Weight, US Weight 50 Pound Umbrella Base, https://www.amazon.com/Weight-Pound-Umbrella-Colors-Available/dp/B0041G6V5W?th=1, 9 pages.
Pier 1, Umbrella Stand on Wheels, https://www.pier1.com/-umbrella-stand-on-wheels/2526804.html, 3 pages.
Greencorner, 60 lbs Low Profile Umbrella Base, https://greencorner.com/bases/lowprofile/b22/, 1 page.

(56) References Cited

OTHER PUBLICATIONS

Premier Tents, History of the Premier Tent Umbrella Weight Bag, 2005-2014, 5 pages.

* cited by examiner

CONTAINER ASSEMBLY SYSTEMS AND METHODS AND COMBINATION OF CONTAINER ASSEMBLY AND WEIGHT MATERIAL ASSEMBLY FOR STABILIZING OBJECTS

TECHNICAL FIELD

The present invention relates to free-standing objects and, more specifically, to weight systems and methods for counteracting tipping forces on portable, free-standing objects.

BACKGROUND

The present invention is of particular significance when applied to umbrella systems, and that application of the present invention will be described herein in detail. However, the principles of the present invention may be applied to other portable, free-standing objects such as patio heaters, patio lighting, traffic or construction cones, and the like. The scope of the present invention should thus be determined based on the claims appended hereto and not the following detailed descriptions of examples of the present invention as applied to free-standing umbrellas.

Umbrellas have long been used to provide protection from sun or rain. At its most basic, an umbrella typically comprises a pole, canopy rods supported by the pole, and a canopy supported by the canopy rods. The canopy rods are typically pivotably supported by the pole such that the umbrella may be reconfigured from a storage configuration in which the canopy rods are parallel to the pole and a use configuration in which the canopy rods radially extend from the pole. A form factor of the canopy in the storage configuration is much smaller than in the use configuration. Certain umbrellas further comprise a collapsible pole that allows an effective length of the umbrella to be altered between the storage configuration and the use configuration.

While many umbrellas are designed to be carried when in the use configuration, one class of umbrellas, referred to herein as free-standing umbrellas, is designed to be supported by the ground. Free-standing umbrellas are commonly used to provide protection from rain or sun on outdoor patios and seating areas for commercial establishments such as bistros or the like.

The pole of a free-standing umbrella is designed to engage the ground directly or to be supported by a base that in turn engages the ground. In either scenario, the umbrella is supported by the ground rather than carried. The manner in which the pole and/or base engage the ground should also counteract tipping forces applied to the umbrella during normal use.

To support a free-standing umbrella in an upright position, the pole may be driven, augered, or otherwise inserted into the ground at a desired location. More commonly, however, a weighted base is provided that is supported on top of the ground. The umbrella pole is inserted into a base stem, and the weight of the base is intended to act on the pole through the stem to prevent tipping of the umbrella during normal use.

The base is often made out of a heavy material such as stone. To minimize shipping costs, the base may take the form of a hollow container that may be shipped empty and filled with a material such as sand or water at the time of use. However, the weight of a conventional base is insufficient to prevent tipping of the umbrella in many situations, such as during heavy winds.

To supplement the weight of the base of a conventional free-standing umbrella, additional weighted material may be placed on top of the base. For example, flexible fabric containers that may be manufactured and shipped inexpensively may be filled with sand at the point of installation of the umbrella and placed on top of the umbrella base.

The need exists for improved fabric containers for providing supplemental weight to a conventional umbrella base.

SUMMARY

The present invention may be embodied as a weight system for supporting a free-standing object comprising a weight material assembly and a container assembly. The weight material assembly comprises weight material and a weight material bag adapted to contain the weight material and has predetermined dimensions. The container assembly comprises a panel assembly and a closure system. The panel assembly defines an interior chamber, an access opening, and an access flap configured to move between an open position in which the interior chamber may be accessed through the access opening and a closed position in which the interior chamber through the access opening is substantially prevented. The closure system is operable in an open configuration in which the access flap may be displaced between the closed and open positions and a closed configuration in which the access flap is secured in the closed position. The interior chamber is sized and dimensioned to accommodate the predetermined dimensions of the weight material assembly. The access opening is sized and dimensioned to allow the weight material assembly to be displaced through the access opening and into the interior chamber. The weight material assembly is arranged within the interior chamber. With the weight material assembly arranged within the interior chamber, the panel assembly is configured in the closed position and the closure system is operated in the closed configuration.

The present invention may also be embodied as a method of supporting a free-standing object comprising the following steps. A weight material assembly is having predetermined dimensions is provided, the weight material assembly comprising weight material and a weight material bag adapted to contain the weight material. A container assembly is provided. The container assembly comprises a panel assembly and a closure system. The panel assembly defines an interior chamber, an access opening, and an access flap configured to move between an open position in which the interior chamber may be accessed through the access opening and a closed position in which the interior chamber through the access opening is substantially prevented. The closure system is operable in an open configuration in which the access flap may be displaced between the closed and open positions and a closed configuration in which the access flap is secured in the closed position. The interior chamber is sized and dimensioned to accommodate the predetermined dimensions of the weight material assembly. The access opening is sized and dimensioned to allow the weight material assembly to be displaced through the access opening and into the interior chamber. The weight material assembly is arranged within the interior chamber. With the weight material assembly arranged within the interior chamber, the panel assembly is configured in the closed position and the closure system is operated in the closed configuration.

The present invention may also be embodied as a weight system for supporting a free-standing object comprising a weight material assembly and a container assembly. The weight material assembly comprises weight material and a weight material bag adapted to contain the weight material, the weight material assembly having predetermined dimensions. The container assembly comprises a panel assembly and a closure system. The panel assembly comprises first, second, third, fourth, fifth, and sixth panels configured to define an interior chamber, where the first panel is configured to define an access opening and an access flap configured to move between an open position in which the interior chamber may be accessed through the access opening and a closed position in which the interior chamber through the access opening is substantially prevented. The closure system comprises at least one of at least one zipper and a hook and loop fastener configured to secure the access flap relative to the first panel in an open configuration in which the access flap may be displaced between the closed and open positions and a closed configuration in which the access flap is secured in the closed position. The interior chamber is sized and dimensioned to accommodate the predetermined dimensions of the weight material assembly. The access opening is sized and dimensioned to allow the weight material assembly to be displaced through the access opening and into the interior chamber. The weight material assembly is arranged within the interior chamber. With the weight material assembly arranged within the interior chamber, the panel assembly is configured in the closed position and the closure system is operated in the closed configuration.

DETAILED DESCRIPTION

Figure 1:
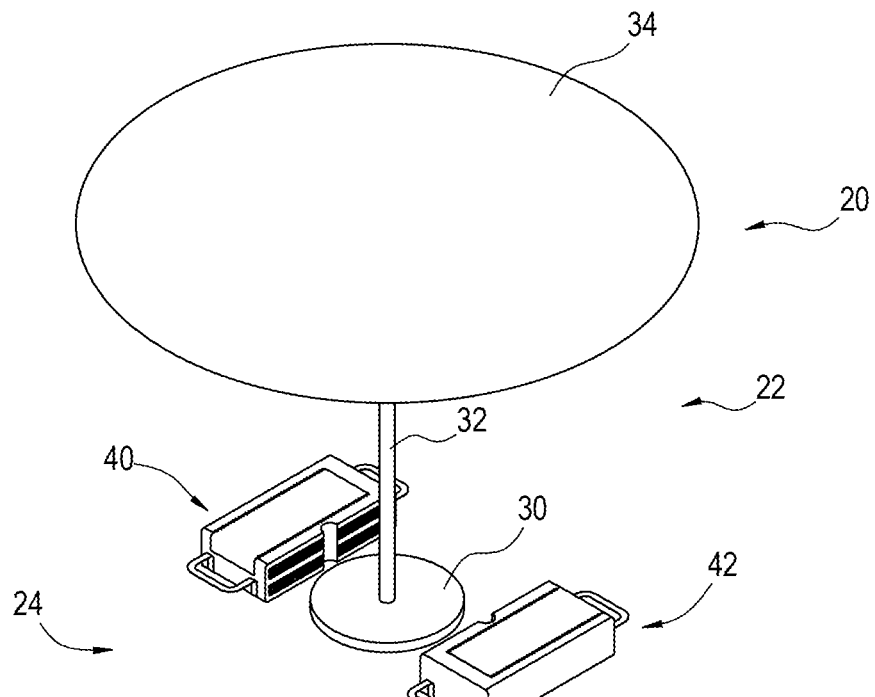
FIG. 1 is a perspective view of a first example umbrella system comprising a first example weight system in an uninstalled configuration.

The present invention may be embodied in several different forms, and several examples of different embodiments of the present invention will be separately described herein.

I. First Embodiment

Referring initially to FIGS. 1-15 of the drawing, depicted therein is a first example umbrella system 20 constructed in accordance with, and embodying, the principles of the present invention. The first example umbrella system 20 comprises an umbrella assembly 22 and a first example weight system 24.

The example umbrella assembly 22 may be incorporated into an umbrella system of the present invention. The example umbrella assembly 22 is or may be conventional and will be described herein only to that extent helpful for a complete understanding of the present invention. The example umbrella assembly 22 comprises an umbrella stand 30, an umbrella pole 32, and an umbrella canopy 34. The example umbrella pole 32 is straight and supports the umbrella canopy 34 directly above the umbrella stand 30, but the present invention is commonly used with multi-part umbrella poles that support the umbrella canopy at a location offset from the umbrella stand 30. One of ordinary skill in the art that the example umbrella assembly 22 is depicted for illustrative purposes and the details of the example umbrella assembly 22 do not per se form a part of the present invention.

The first example weight system 24 comprises two separate weight assemblies 40 and 42 as depicted in FIGS. 1, 2, 14, and 15. The example weight assemblies 40 and 42 may be referred to herein as first example weight assemblies. For clarity, the specific weight assembly 40 may be referred to as the first first example weight assembly, and the specific weight assembly 42 may be referred to as the second first example weight assembly. However, the first and second first example weight assemblies 40 and 42 are the same, and only the first first example weight assembly 40 will be described herein in detail in the interests of brevity and clarity.

The first example weight assembly 40 will now be described herein with reference to FIGS. 3-13. The first example weight assembly 40 comprises a weight material assembly 50 and a first example container assembly 52.

The example weight material assembly 50 comprises weight material 60 and a weight material bag 62. The weight material 60 is typically a heavy, loose material such as sand or gravel. Heavy, loose material such as the example weight material 60 may purchased in bulk or may be purchased in bags such as the weight material bag 62. The example weight material 60 is or may be conventional and will not be described herein beyond that extent helpful to a complete understanding of the present invention.

Weight material bags such as the example weight material bag 62 are typically fabricated to define predetermined volumes, and each predetermined volume defines a particular quantity of the weight material 60. For example, sand, gravel, and concrete materials are typically sold in bags the volume of which are predetermined to correspond to either 60 pounds or 90 pounds of material. Further, for transportation and display purposes, weight material bags such as the example weight material bag 62 are typically generally in the shape of a three-dimensional rectangle when filled with the weight material 60. Accordingly, as generally depicted in FIG. 11, when filled the weight material bag 62 defines a first dimension D1, a second dimension D2, and a third dimension D3, with the volume defined by the weight material bag 62 being approximately equal to the product of D1, D2, and D3.

The example weight material bag 62 is typically made of a single ply of material or multiple (two or more) plies of materials. As an example of a single ply of material, the weight material bag may be made of a single sheet of paper folded to define the shape of the weight material bag 62 as described above. In this case, the paper material is sufficiently tear resistant and glued at folds and/or seams to allow the weight material assembly 50 to be transported and stored with low risk of inadvertent tearing of the weight material bag 62 and/or leakage of the weight material 62. When the material from which the weight material bag 62 is made comprises a plurality of plies, at least one ply is primarily a strength material (e.g., paper or woven fabric) and at least one ply is a seal material (e.g., plastic). The strength material allows the weight material assembly 50 to be transported and stored with low risk of inadvertent tearing of the weight material bag 62 and/or leakage of the weight material 62. The seal material, if used, is designed to inhibit leakage of the weight material and transmission of fluids (e.g., water) from the exterior to the interior of the weight material bag 62. Typically, the material from which the example weight material bag 62 is made is designed to be cut or torn open at the point of use to allow dispensing of the weight material (e.g., spreading of gravel forming the weight material). The weight material bag 62 is or may be conventional and will not be described herein beyond that extent helpful to a complete understanding of the present invention.

As depicted in FIGS. 10, 11, 12, and 13, the first example container assembly 52 is sized and dimensioned to receive the entire weight material assembly 50. The exact dimensions of weight material assemblies such as the example weight material assembly 50 may vary depending on factors such as manufacturing tolerances, supplier specifications, and the like. Accordingly, the first example container assembly 52 will typically be slightly oversized to ensure that any particular weight material assembly 50 can be accommodated. However, oversizing should be somewhat minimized to ensure a relatively tight fit of the weight material assembly 50 within the container assembly 52. A relatively tight fit can improve the ability to transport the container assembly 52 with the weight material assembly 50 contained therein and the appearance of the first example weight assembly 40 during use.

Figure 3:
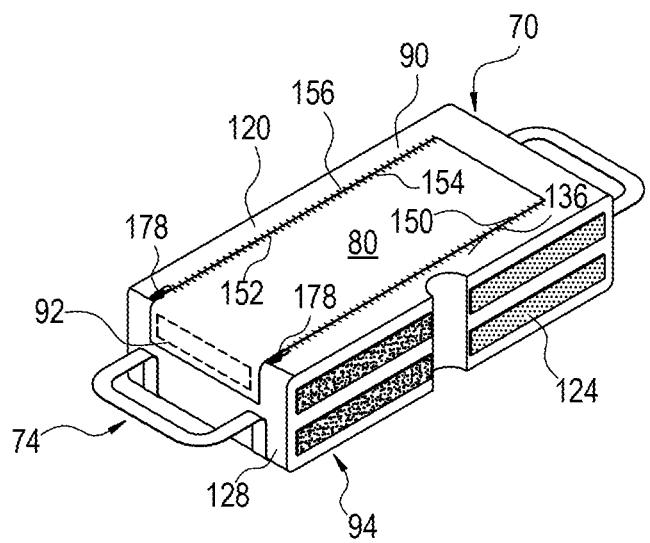
FIG. 3 is a perspective view of a first example weight assembly used by the first example weight system.
Figure 11:
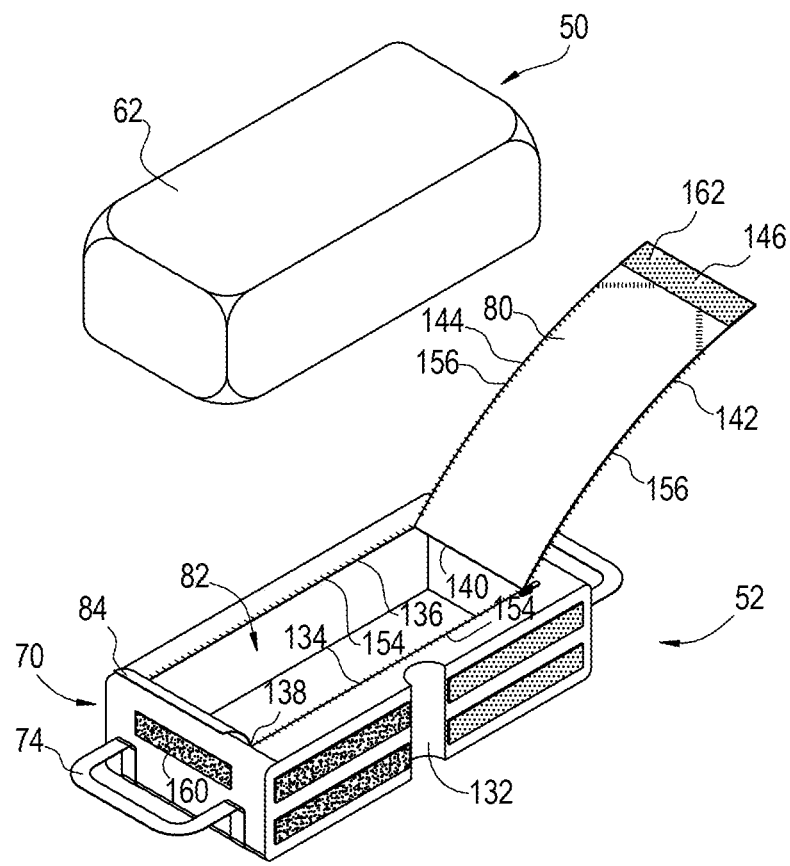
FIG. 11 is a perspective view of illustrative a first step of a process of forming the first example weight assembly.
Figure 12:
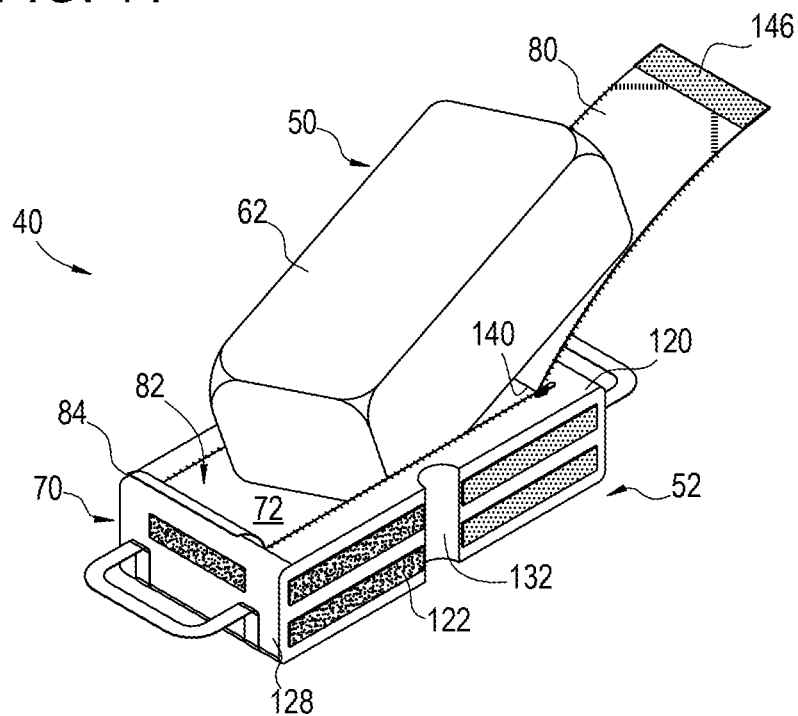
FIG. 12 is a perspective view illustrative of a second step of the process of forming the first example weight assembly.
Figure 13:
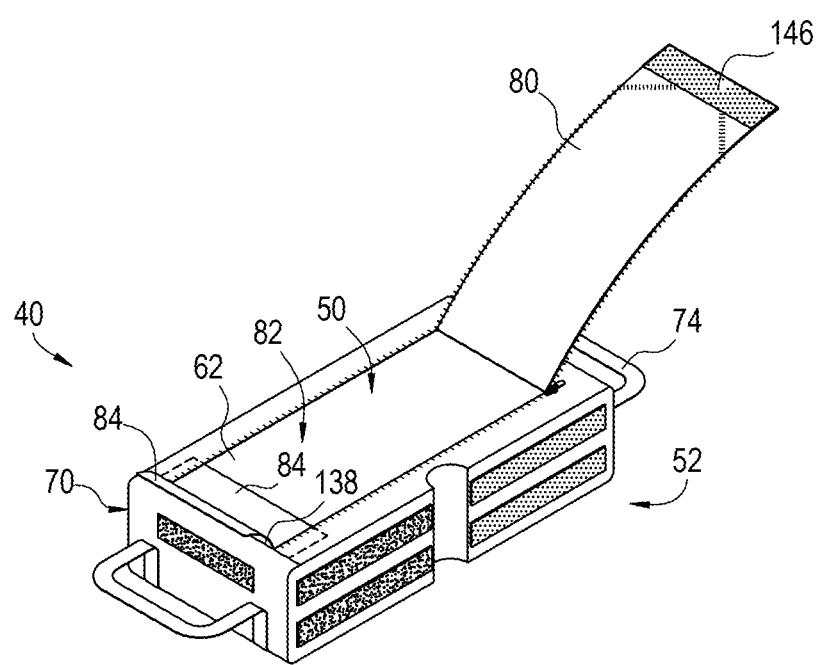
FIG. 13 is a perspective view illustrative of a third step of the process of forming the first example weight assembly.

As shown in FIGS. 11-13, the first example weight assembly 40 is formed by first placing the container assembly 52 in an open configuration (FIG. 11) and displacing weight material assembly 50 relative to the container assembly 52 (FIG. 12) such that the entire weight material assembly 50 is arranged within the container assembly 52 (FIG. 13). The container assembly 52 is then placed in its closed configuration to secure the weight material assembly 50 within the container assembly 52 (FIG. 3). The first example weight assembly 40 may then be used alone or in connection with another similar or identical weight assembly to form the example weight system 24. The weight system 24 is then arranged on top of the umbrella stand 30 to help maintain the umbrella pole 32 and the umbrella canopy 34 in a desired orientation.

The details of construction of the first example container assembly 52 will now be described in further detail. The first example container assembly 52 comprises a panel assembly 70 defining an interior chamber 72 and a carrying member 74. The example panel assembly 70 is formed of one or more panels made of flexible fabric sewn together in a configuration capable of maintaining a three-dimensional rectangular shape as generally described above. A first portion of the panel assembly 70 is configured to define an access flap 186 configurable between an open position (FIGS. 11-13) in which an access opening 82 is uncovered and a closed position (FIGS. 3-10) in which the access opening 82 is covered. A second portion of the example panel assembly 70 defines an optional seal flap 84 configurable to cover at least a portion of the access opening 82.

The first example container assembly 52 further comprises a primary closure system 90 and, optionally, a secondary closure system 92. The primary closure system 90 in a first primary closure configuration allows the access flap 80 to be secured relative to the access opening 82 to maintain the example container assembly 52 in its closed configuration. If used, the secondary closure system 92 in a first secondary closure configuration further secures the access flap 80 relative to the access opening 82 to maintain the example container assembly 52 in its closed configuration. However, arranging the primary closure system 90 in a second primary closure configuration and, if used, the secondary closure system 92 in a second secondary closure configuration allows the access flap 80 to be moved relative to the access opening 82 to items such as the weight material assembly 50 to be placed into the interior compartment 72 through the access opening 82.

Figure 2:
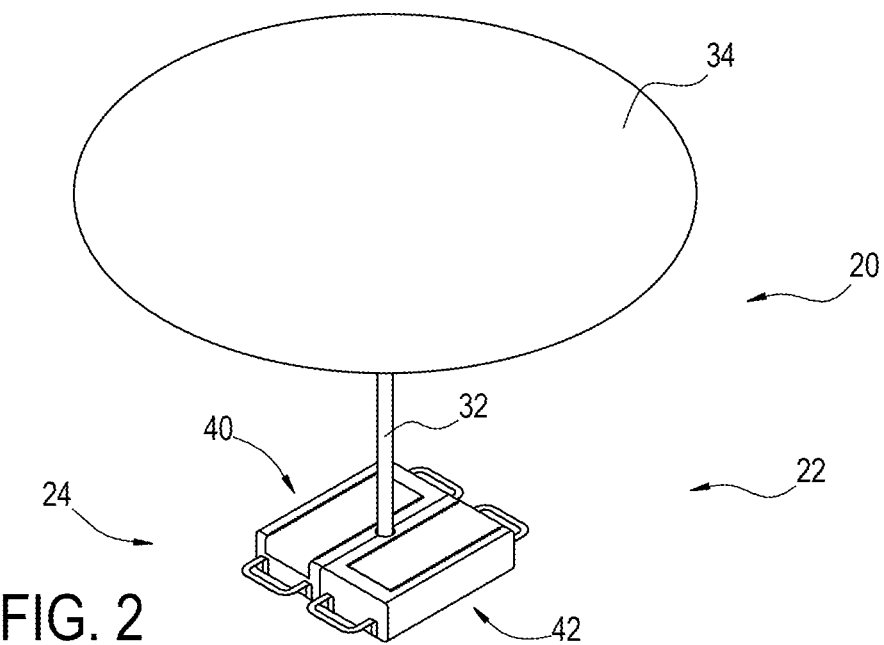
FIG. 2 is a perspective view of the first example umbrella system comprising the first example weight system in an installed configuration.

The first example container assembly 52 further comprises an optional attachment system 94. The example attachment system 94 is configured to allow the first first example weight assembly 40 to be detachably attached to the second first example weight assembly 42. As shown in FIG. 2, the first and second first example weight assemblies 40 and 42 are combined to form the example weight system 24, and the attachment system 94 secures the weight assemblies 40 and 42 to each other to inhibit movement of the weight system 24 relative to the umbrella assembly 24. The attachment system 94 may also be configured to allow only one of the first example weight assemblies 40 or 42 to be secured to the umbrella assembly 24 as will be described in further detail below.

The details of the example panel assembly 70, primary closure system 90, secondary closure system 92, and attachment system 94 will now be described in further detail.

The example panel assembly 70 is made of one or more panels of flexible material stitched together. The material from which the panel assembly 70 is made is ideally resistant to the passage of liquid and solid particulate such as sand or gravel in to or out of the interior compartment 72 through the panel assembly 70. The material from which the panel assembly 70 is made is further strong enough to contain the weight material assembly 40 and/or loose weight material 60 during normal use of the first example container assembly 52. The first example container assembly 52 is also typically left exposed to the elements for extended periods of time, so the material from which the panel assembly 70 is made should resistant to degradation due to exposure to sun, rain, snow, temperature extremes, and the like.

During normal use of the first example weight assembly 40, the panel assembly 70 generally takes on the shape of a three-dimensional rectangle and thus defines an upper wall 120, a lower wall 122, a first side wall 124, a second side wall 126, a first end wall 128, and a second end wall 130. A notch wall 132 is defined by the first side wall 124. During normal use, the walls 120-130 are substantially flat, and the notch wall 132 is substantially semi-cylindrical to accommodate at least a portion of the substantially umbrella pole 32. In the example panel assembly 70, the example access opening 82 is bounded at least in part by an upper wall first side edge 134, an upper wall second side edge 136, and an upper wall end edge 138.

The access flap 80 is formed by at least a portion of one of the walls 120-130. The example access flap 80 is formed by at least a portion of the upper wall 120. More specifically, the example access flap 80 is formed by first and second slits 134 and 136 formed in the upper wall 120. In the example panel assembly 70, the example access opening 82 is bounded by a flap hinge edge 140, a flap first side edge 142, a flap second side edge 144, and a flap end edge 146. The example access flap 80 is connected to the upper wall 120 at the flap hinge edge 140, and the flap hinge edge 140 further defines one side of the access opening 82.

In the first example container assembly 52, the example primary closure system 90 comprises a first primary closure assembly 150 and a second primary closure assembly 152. The first primary closure assembly 150 is arranged to secure the flap first side edge 142 to the upper wall first side edge 134, and the second primary closure assembly 152 is arranged to secure the flap second side edge 136 to the upper wall second side edge 138. The example first and second primary closure assemblies 150 and 152 are substantially the same and each define a closure assembly first portion 154 and a closure assembly second portion 156. When the primary closure assembly 90 is in its secured configuration, the example closure assembly first and second portions 154 and 156 are configured to engage each other to mechanically secure the side edges 134 and 142 and the side edges 136 and 144 and substantially to prevent movement of water and/or particulate material between these respective edges 134 and 142 and 136 and 144.

If used, the example secondary closure system 92 comprises a secondary closure system first portion 160 and a secondary closure system second portion 162. When the second closure assembly 92 is in its secured configuration, the example secondary closure system first and second portions 160 and 162 are configured to engage each other to mechanically secure the flap end edge 146 relative to the upper wall end edge 138 and substantially to prevent movement of water and/or particulate material between these respective edges 138 and 146.

Figure 9:
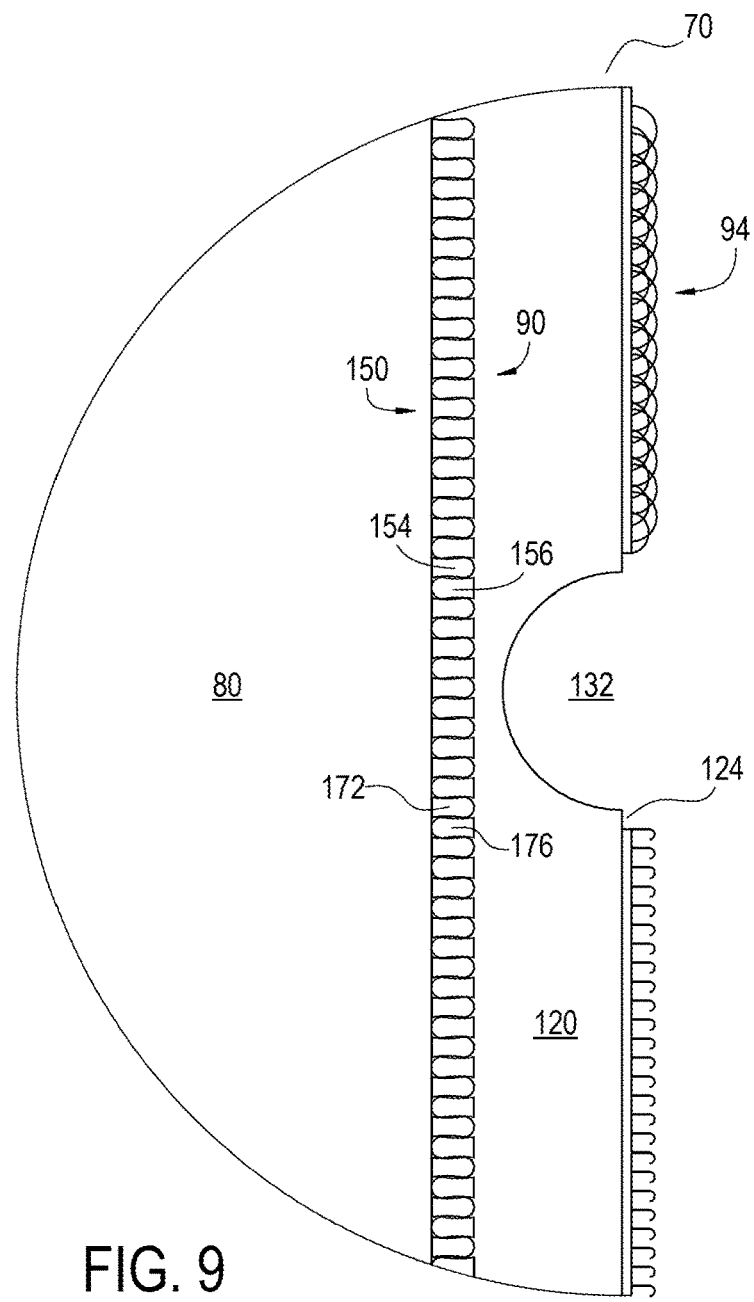
FIG. 9 is a detail of a portion of FIG. 6.
Figure 10:
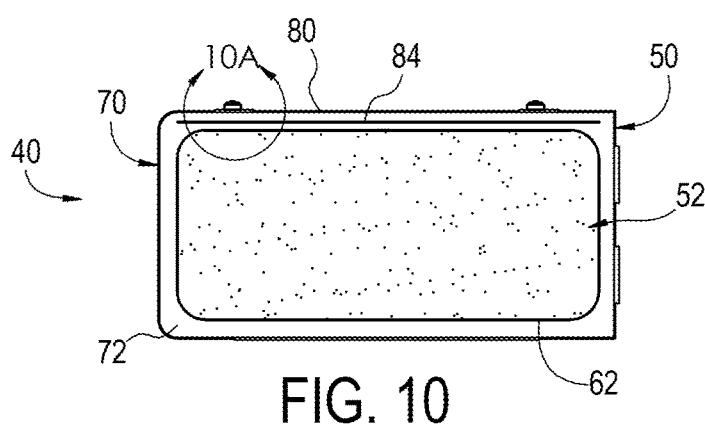
FIG. 10 is a section view taken along lines 10-10 in FIG. 6.
Figure 10A:
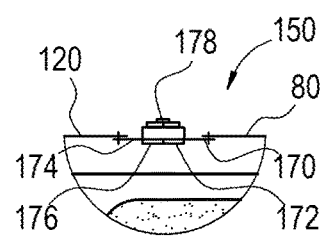
FIG. 10a is detail view of a portion of FIG. 10.

As perhaps best shown in FIGS. 9 and 10A, the example first and second closure assemblies 150 and 152 are each formed by zipper assemblies comprising a first zipper panel 170 supporting first zipper teeth 172, a second zipper panel 174 supporting second zipper teeth 176, and a zipper slider 178. The first zipper panels 170 are secured to the flap first and second side edges 142 and 144, while the second zipper panels are secured to the upper wall first and second side edges 134 and 136. Displacing the zipper sliders 178 in a first direction allows the zipper teeth 172 and 176 to engage each other and in a second direction disengages the zipper teeth 172 and 176 from each other. However, the first and second primary closure assemblies 150 and 152 may be any structure capable of joining the respective edges 142 and 134 and 144 and 136. As examples, the first and second primary closure assemblies 150 and 152 may be formed by a hook and loop fastener system, by a lace system, or by a button system.

As shown in FIG. 11, the example secondary closure system 92 may be formed by a hook and loop fastener system, in which case the first portion 160 is formed by a loop panel secured to the first end wall 128 of the panel assembly 70 and the second portion 162 is formed by a hook panel secured to the access flap 80 adjacent to the flap end edge 146. However, the secondary closure structure 92, if used, may be any structure capable of fixing the flap end edge 146 relative to the upper wall end edge 138. As examples, the first and second primary closure assemblies 150 and 152 may be formed by a zipper system, by a lace system, or by a button system.

Figure 4:
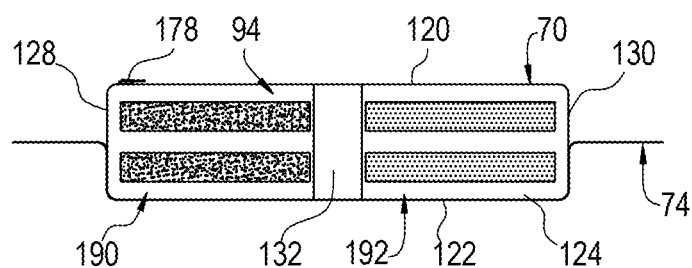
FIG. 4 is a side elevation view showing a first side wall of the first example weight assembly.
Figure 5:
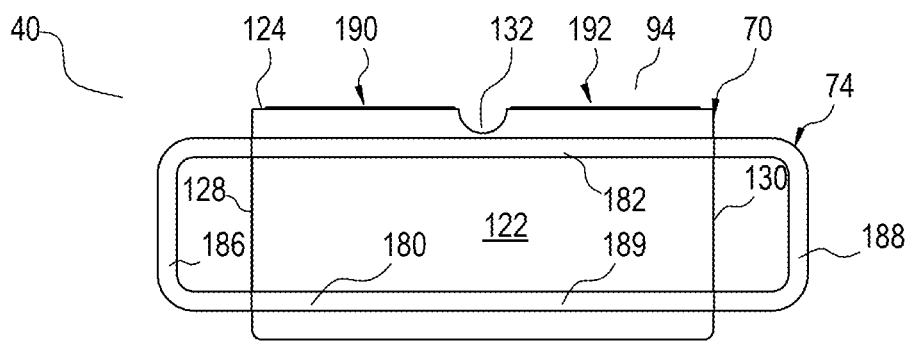
FIG. 5 is a bottom plan view showing a lower wall of the first example weight assembly.
Figure 6:
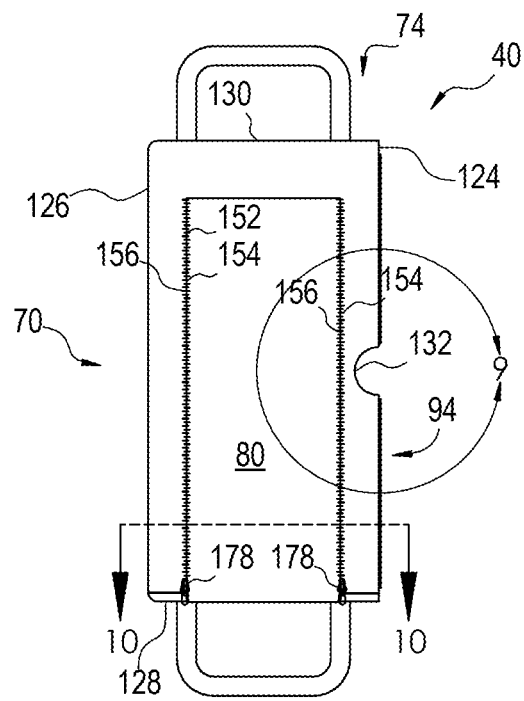
FIG. 6 is a top plan view showing a first end wall of the first example weight assembly.
Figure 7:
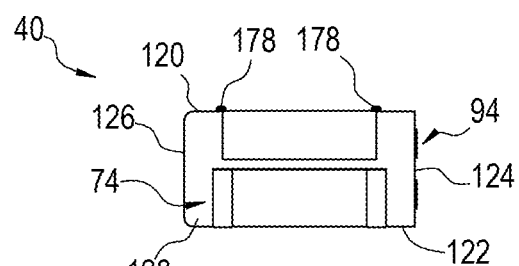
FIG. 7 is an end elevation view showing a second side wall of the first example weight assembly.
Figure 8:
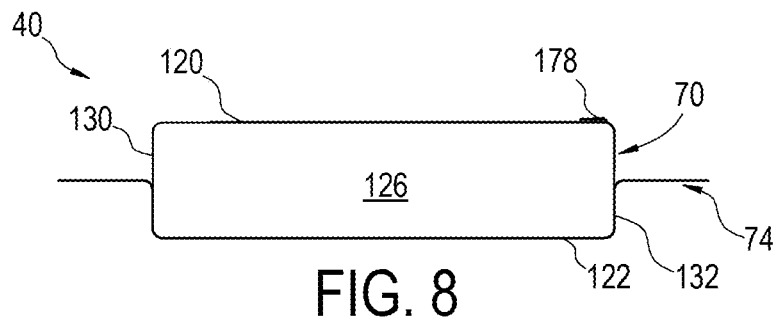
FIG. 8 is side elevation view showing an upper wall of the first example weight assembly.

As perhaps best shown in FIG. 5, the example carrying member 74 is formed by a strap member 180 sewn into an endless loop. In particular, first and second lower portions 182 and 184 are sewn to the lower wall 122 of the panel assembly 70 such that first and second handle portions 186 and 188 extend beyond the first and second end walls 128 and 130, respectively, of the panel assembly 70. As shown in FIGS. 3 and 4, at least one portion of the first and second handle portions 186 and 188 may be secured to the first and second end walls 128 and 130 to support the handle portions 186 and 188 above the lower wall 122 during normal use of the first example weight assembly 40.

As perhaps best shown in FIGS. 3 and 4, the example attachment system 94 comprises a first portion 190 and a second portion 192. In the first example container assembly 52, the first portion 190 is secured to the first side wall 124 on a first side of the notch wall 132 and the second portion 192 is secured to the second side wall 124 on a second side of the notch wall 132. The first and second portions 190 and 192 on the first first example weight assembly 40 are adapted to engage similar first and second portions 190 and 192 on the second first example weight assembly 42 to detachably attach the first and second first example weight assemblies 40 and 42 together. In use, the first and second first example weight assemblies 40 and 42 are detachably attached with at least a portion of the umbrella pole 32 arranged within the notches formed by the notch walls 132 of the weight assemblies 40 and 42.

Figure 14:
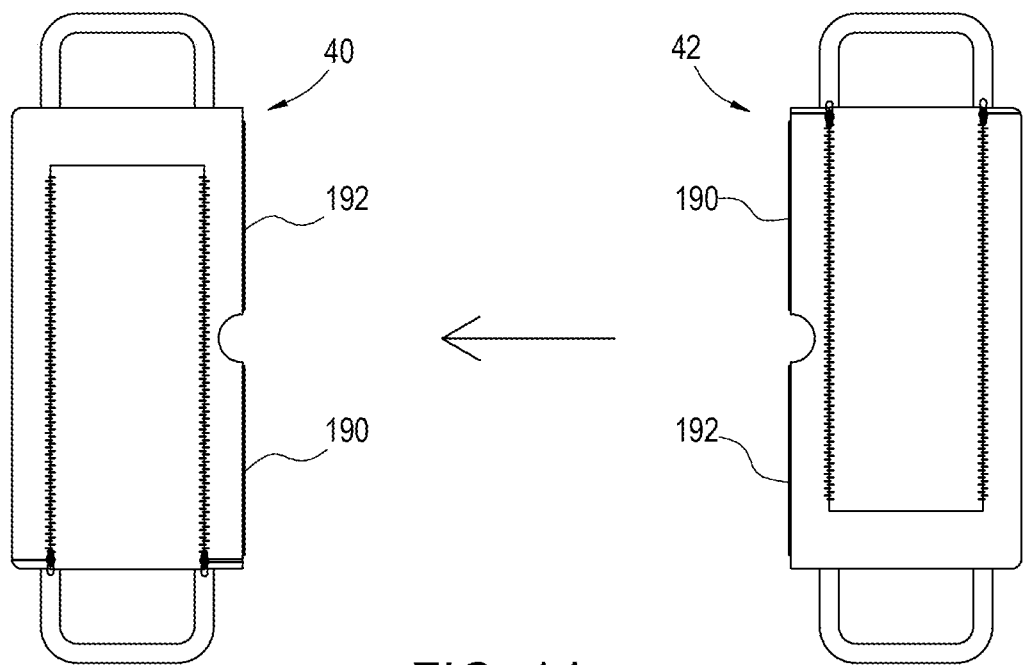
FIG. 14 is a top plan view illustrative of a first step of a method of forming the first example weight system from first and second first example weight assemblies.
Figure 15:
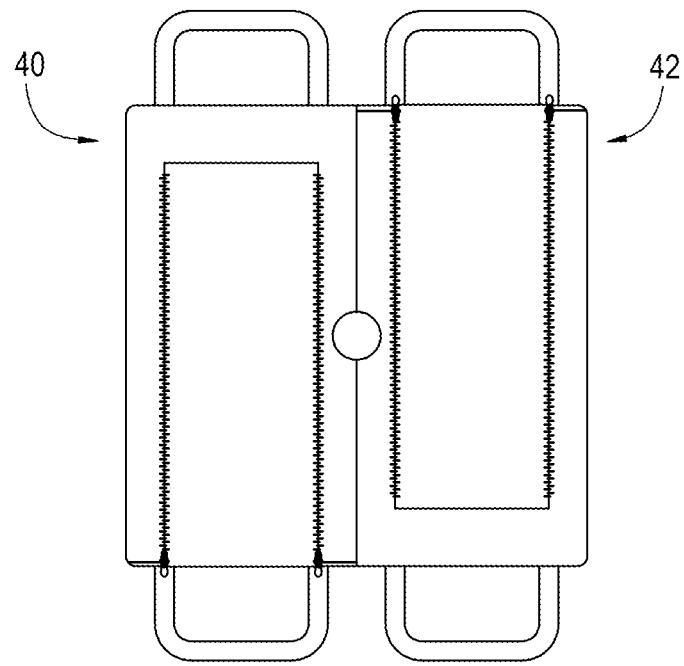
FIG. 15 is a top plan view illustrative of a second step of the method of forming the first example weight system from first and second first example weight assemblies.

In the first example container assembly 52, the first portion 190 is formed by two strips of loop material, while the second portion 192 is formed by two strips of hook material. When either of the first and second first example weight assemblies 40 and 42 is displaced towards the other as shown in FIG. 14, the hook material on the first first example weight assembly 40 is arranged to engage the loop material on the second first example weight assembly 42, while the hook material on the second first example weight assembly 42 is arranged to engage the loop material on the first first example weight assembly 40 as shown in FIG. 15. If used, the attachment system 94 may be any structure capable of first and second first example weight assemblies together. As examples, the attachment system 94 may be formed by a zipper system, by a lace system, by a button system, or by straps or cords.

If used, the optional example seal flap 84 may be arranged in a raised position as shown in FIGS. 11 and 12 to facilitate insertion of the weight material assembly 50 through the access opening 82 and into the interior compartment 72 and in a lowered position as shown in FIGS. 10 and 13 to inhibit movement of weight material 60 out of the access opening 82 between the flap end edge 146 and the upper wall end edge 138. While the weight material bag 62 will provide a primary barrier to prevent leakage of the weight material 60 out of the interior compartment 72, the weight material bag 62 is not completely sealed. Accordingly, the seal flap 84 will cooperate with the access flap 80 to form a secondary barrier that inhibits leakage of weight material 60 out of the interior compartment 72.

II. Second Embodiment

Figure 16:
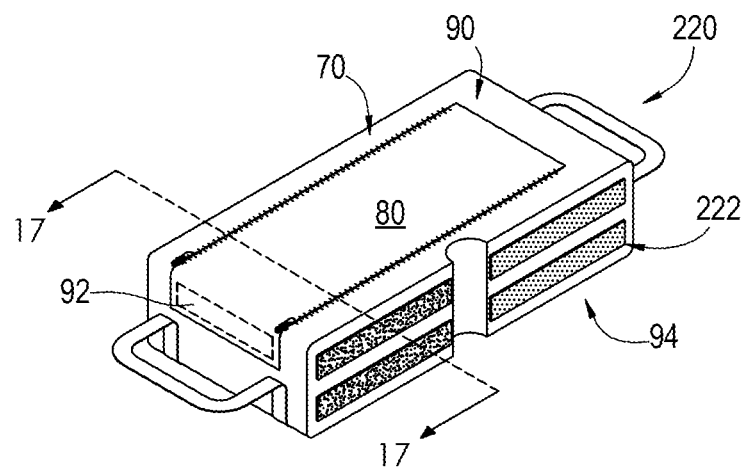
FIG. 16 is a perspective view of a second example weight assembly that may be used in the same manner as the first example weight assembly.
Figure 17:
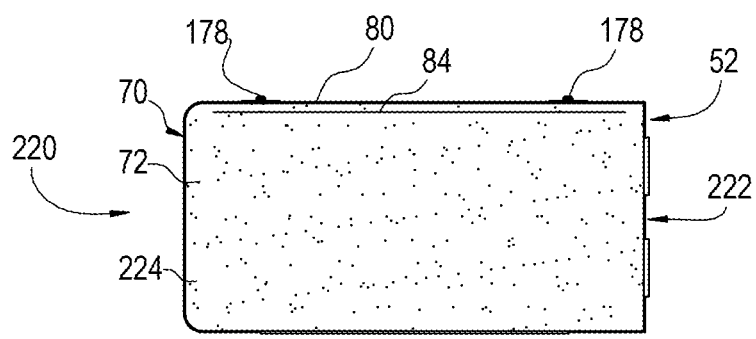
FIG. 17 is a section view taken along lines 17-17 in FIG. 16.
Figure 18:
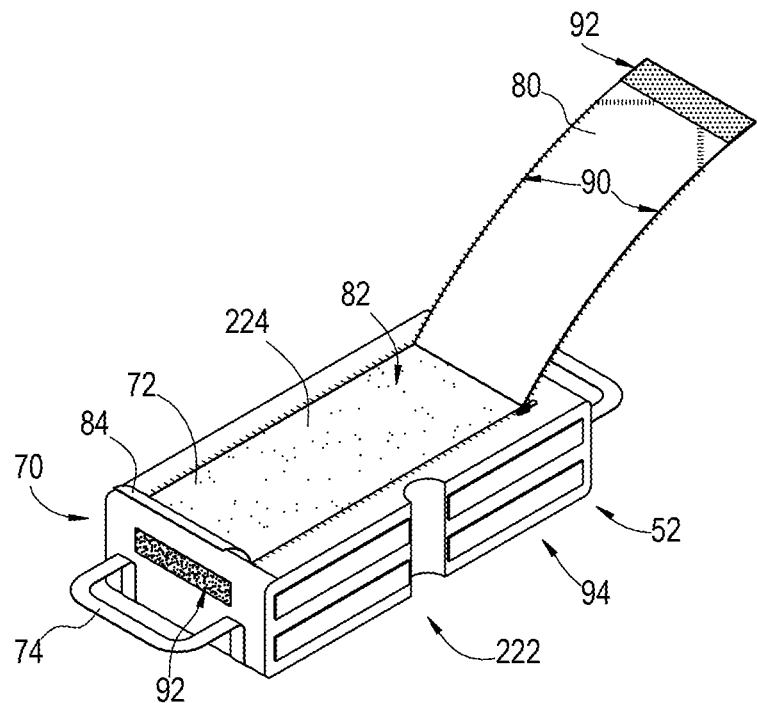
FIG. 18 is a perspective view illustrative of a step in a method of forming the second example weight assembly.

Referring now to FIGS. 16-17 of the drawing, depicted therein is a second example weight system 220 constructed in accordance with, and embodying, the principles of the present invention. The second example weight system 220 comprises one or more of container assemblies 222 filled with weight material 224. The example container assembly 222 depicted in FIGS. 16-17 is the same as the first example container assembly 52 described above. The weight material 224 is the same as the example weight material 60 described above. The difference between the example weight system 220 and the weight system 24 described above is that the weight material 60 is loosely contained within the container assembly 222 and is not additionally contained by a weight material bag such as the weight material bag 62 described above. The second example weight system 220 illustrates that the first example container assembly 40 or 42 may be the primary containment barrier for the weight material 62 in the absence of the weight material bag 62.

Again, if used, the optional example seal flap 84 in its lowered position as shown in FIG. 17 will inhibit movement of weight material 60 out of the access opening 82 between the flap end edge 146 and the upper wall end edge 138. In the absence of the weight material bag 62, the seal flap 84 will cooperate with the access flap 80 to form a barrier that further inhibits leakage of weight material 222 out of the interior compartment 72.

III. Third Embodiment

Figure 19:
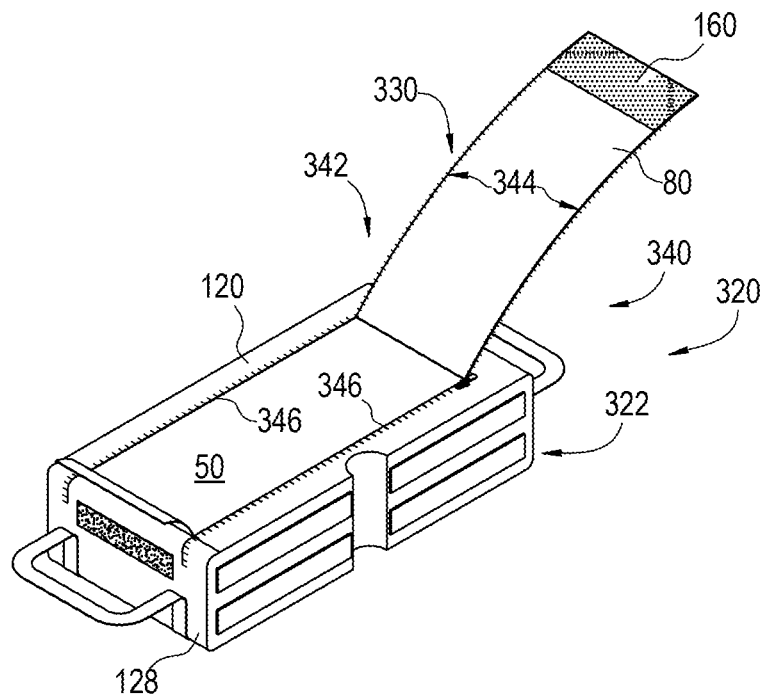
FIG. 19 is a perspective view of a second example container assembly that may be used to form a weight assembly of the present invention.

Referring now to FIG. 19 of the drawing, depicted therein is a third example weight system 320 constructed in accordance with, and embodying, the principles of the present invention. The third example weight system 220 comprises one or more second example container assemblies 322. The second example container assembly 322 depicted in FIG. 19 will be described herein only to the extent that the second the first example container assembly 52 described above. Reference characters used to identify components of the first example container assemblies 40 and 42 will also be used in FIG. 19 to identify corresponding components of the second example container assembly 322.

The second example container assembly 322 comprises a primary closure system 330 comprising first and second closure assemblies 340 and 342. The first and second closure assemblies 340 and 342 each comprise a closure assembly first portion 344 and a closure assembly second portion 346. As shown in FIG. 19, the closure assembly first portions 344 extend along a portion of the upper wall 120 and down along a portion of the first end wall 124. FIG. 19 also illustrates that the closure assembly second portions 346 extend over at least a portion of the secondary closure assembly first portion 160 on the access flap 80. The closure assembly first and second portions 344 and 346 thus provide enhance the ability of the primary closure system 330 to cover the access opening 82, especially adjacent to the upper wall end edge 138. Like the first and second closure assemblies 150 and 152, the first and second closure assemblies 340 and 342 are each formed by a zipper system, but one or both of the first and second closure assemblies 340 and 342 may be formed by other closure systems such as hook and loop systems, lace systems, and button systems.

The third example weight system 320 further comprises weight material (not visible in FIG. 19) that may be the same as the example weight material 60 described above. The third example weight system 330 may be configured to enclose the weight material in the form of the weight material assembly 50 as shown or, alternatively, in loose form like the second example weight system 220 described above.

IV. Fourth Embodiment

Figure 20:
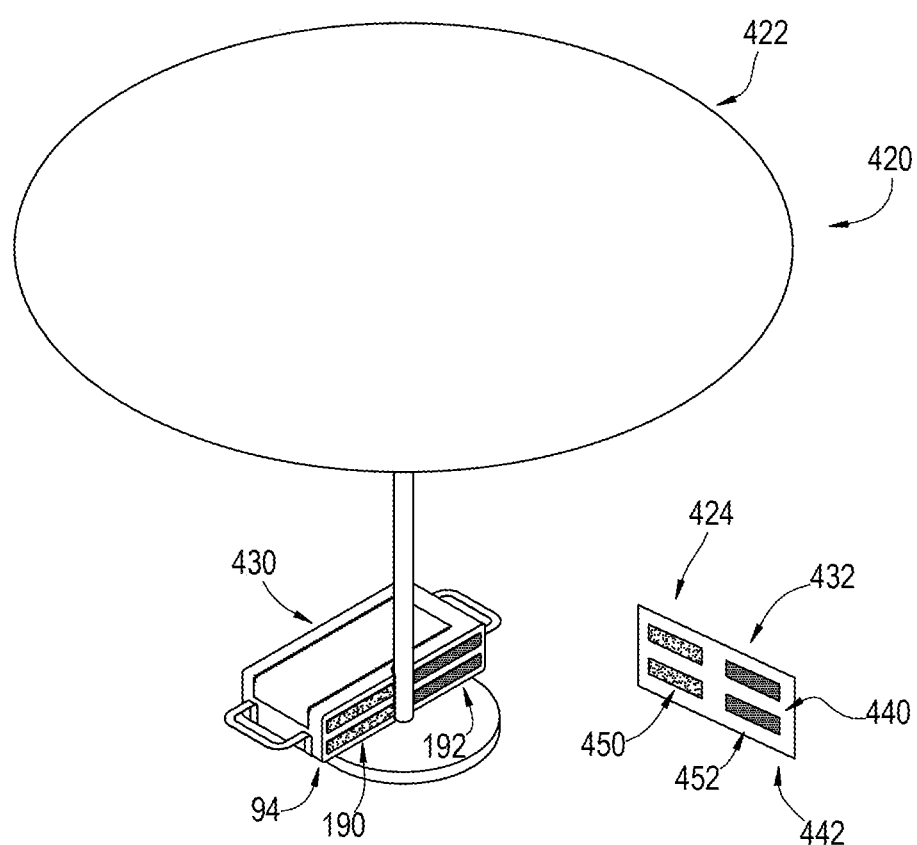
FIG. 20 is a perspective view of a second example umbrella system using only one of the first example weight assembly or the second example weight assembly.
Figure 21:
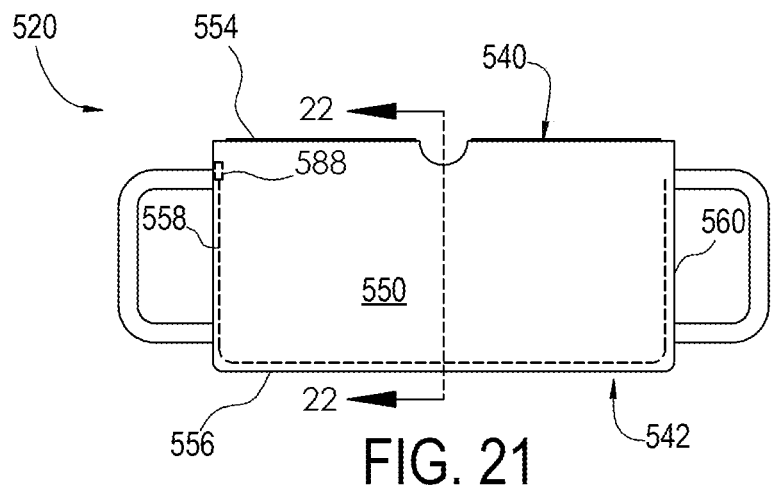
FIG. 21 is a top plan view of a third example container assembly that may be used to form a weight assembly of the present invention.

Referring now to FIG. 20 of the drawing, depicted therein is second example umbrella system 420 comprising an umbrella assembly 422 and a fourth example weight system 424 constructed in accordance with, and embodying, the principles of the present invention. The example umbrella assembly 422 is or may be the same as the example umbrella assembly 22 described above. Reference characters used to identify components of the example umbrella assembly 22 will also be used in FIG. 20 to identify corresponding components of the example umbrella assembly 422.

The fourth example weight system 424 comprises a container assembly 430 and an attachment panel assembly 432. The container assembly 430 may be either of the first example container assembly 40 or the second example container assemblies 322 as described above, but the container assembly 430 is represented in FIG. 20 as the first example container assembly 40. Reference characters used to identify components of the example container assembly 40 will also be used in FIG. 20 to identify corresponding components of the example container assembly 422.

The example attachment panel assembly 432 comprises a sheet 440 that supports an attachment system 442 configured to engage the attachment system 94 on the container assembly 430. With umbrella pole 32 within the notch formed notch wall 132 and the attachment system 442 detachably attached to the attachment system 94, the sheet 440 inhibits movement of the container assembly 430 relative to the umbrella assembly 422. The sheet 440 may either be made of a rigid material or a flexible material.

More specifically, the example attachment system 442 comprising a first portion 450 and second portion 452. The first portion 450 is adapted to engage the second portion 192 of the attachment system 94 on the container assembly 330, and the second portion 452 is adapted to engage the first portion 190 of the attachment system 94. The attachment systems 94 and 442 are formed by strips of hook and loop material, with the example first portions 190 and 450 being formed by strips of loop material and the example second portions 192 and 452 being formed by strips of hook material. Other attachment systems such as straps, belts, zippers or the like may be used to secure the container assembly 430 relative to the umbrella assembly 422.

V. Fifth Embodiment

Referring now to FIGS. 21, 22, 22A, 23, and 23A of the drawing, depicted therein is a fifth example weight system 520 constructed in accordance with, and embodying, the principles of the present invention. The fifth example weight system 520 comprises a weight material assembly 530 and a third example container assembly 532. The weight material assembly 530 is or may be the same as the example weight material assembly 50 described above. Reference characters used to identify components of the example weight material assembly 50 will also be used in FIG. 21 to identify corresponding components of the example weight material assembly 530.

The third example container assembly 532 comprises a panel assembly 540 and a closure assembly 542. The example panel assembly 540 defines an upper wall 550, a lower wall 552, a first side wall 554, a second side wall 556, a first end wall 558, and a second end wall 560. The upper wall 550 is connected to or integrally formed with the first side wall 554 but is disconnected from second side wall 556 and the first and second end walls 558 and 560. The upper wall 550 thus forms an access flap that is displaceable between an open position and a closed position relative to the sidewalls 554 and 556 and end walls 558 and 560. With the upper wall 550 in the closed position, the panel assembly 540 defines an interior chamber 562. With the upper wall 550 in the open position, access to the interior chamber 562 is allowed through an access opening 564 that is covered by the upper wall 550 in the closed position.

The example closure assembly 542 comprises a first closure portion 570 and a second closure portion 572. The first closure portion 570 is secured the upper wall 550 around three sides of the access opening 564. The second closure portion 572 is secured to the first end wall 558, the second side wall 554, and the second end wall 560 such that the second closure portion 572 also extends around three sides of the access opening 564. The first and second closure portions 570 and 572 are adapted to be detachably attached to each other to secure the upper wall 550 in its closed position or detached from each other to allow the upper wall 550 to be displaced between the closed position and the open position. When the closure system 542 secures the upper wall 550 in the closed position, movement of weight material 60 through the closure system 542 during normal use of the fifth example weight system 520 is inhibited.

Figure 22:
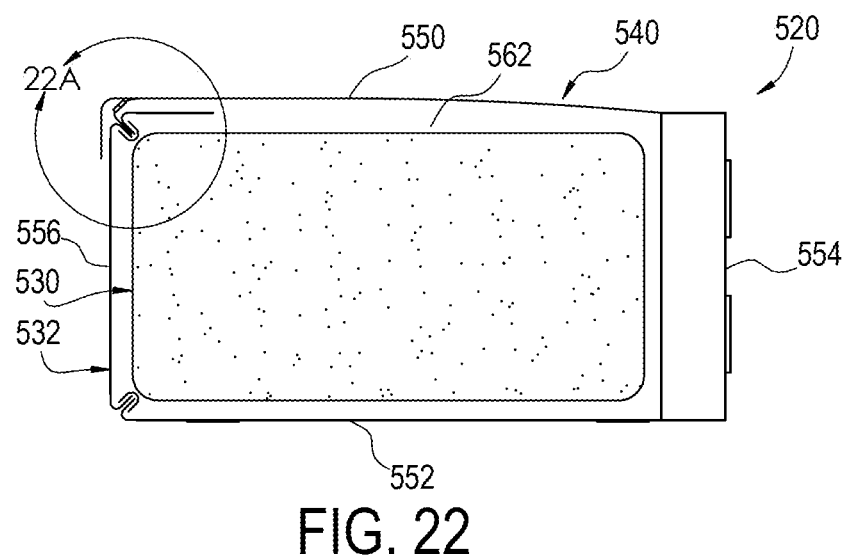
FIG. 22 is a section view taken along lines 22-22 in FIG. 21.
Figure 22A:
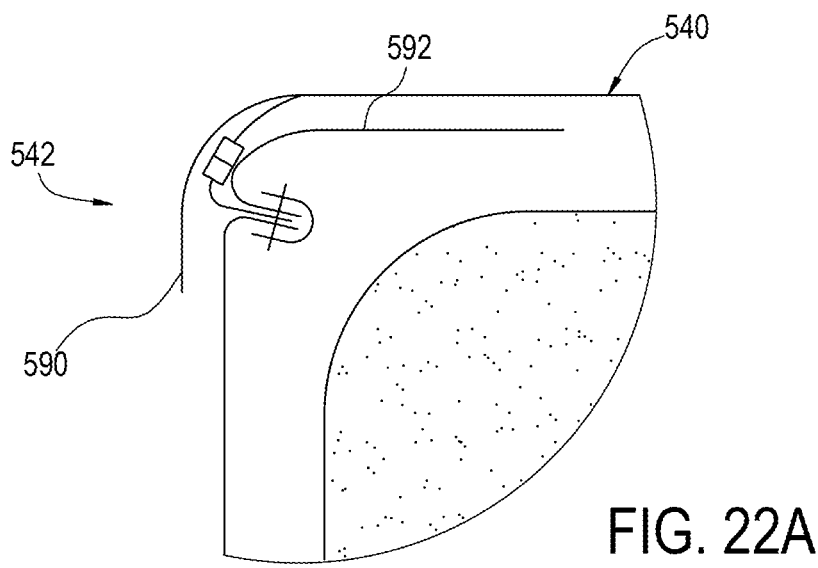
FIG. 22A illustrates details of the section view of FIG. 22.
Figure 23:
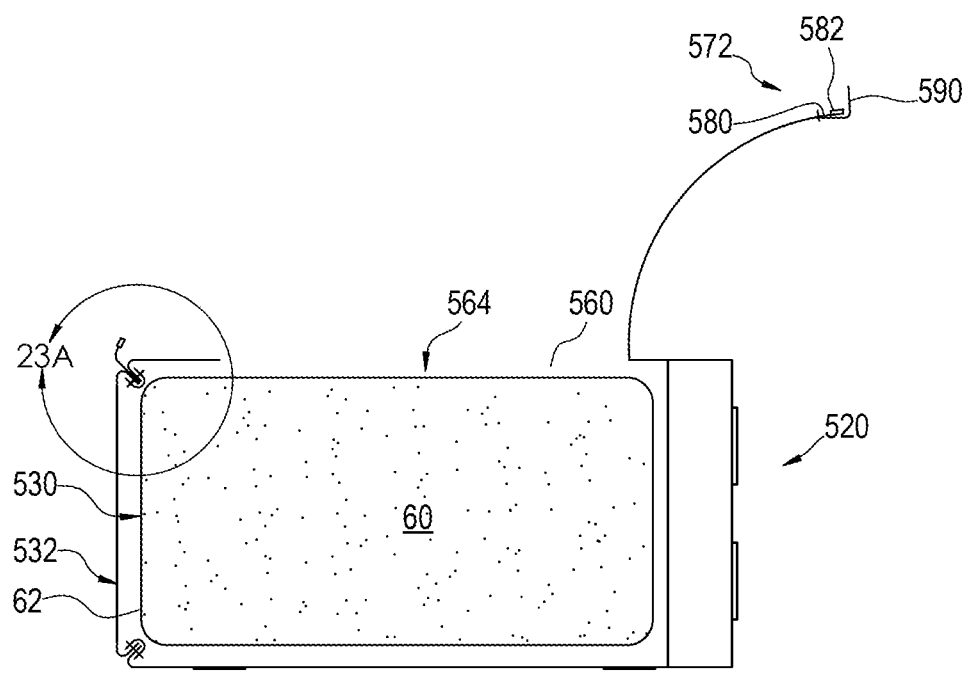
FIG. 23 is a section view similar to FIG. 22 illustrating the third example container assembly in an open configuration.
Figure 23A:
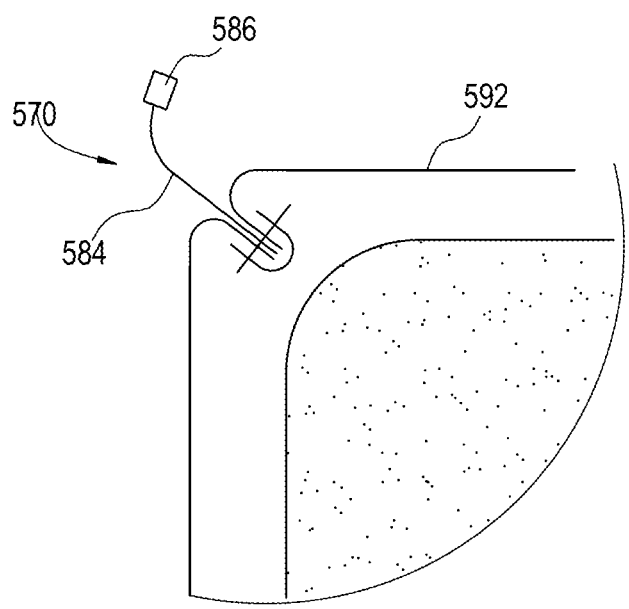
FIG. 23A illustrates details of the section view of FIG. 23.

The example closure assembly 542 is formed by a zipper assembly comprising a first zipper panel 580 and first zipper teeth 582 forming the first closure portion 570, a second zipper panel 584 and second zipper teeth 586 forming the second closure portion, and a zipper slider 588 for allowing the first and second zipper teeth to be connected and disconnected in a conventional manner. As shown in FIGS. 22 and 23, first zipper panel 580 is sewn around a perimeter of the upper wall 550, while the second zipper panel 584 is sewn to the first end wall 558, the second side wall 554, and the second end wall 560 adjacent to the access opening 564.

FIGS. 22 and 23 further illustrate that the upper wall 550 extends beyond the first zipper panel 580 such that, when the closure assembly 542 is closed, the upper wall 550 defines an optional overhang 590 that covers the closure assembly 542 to inhibit movement of weight material 60 through the closure system 542 during normal use of the fifth example weight system 520.

FIGS. 22 and 23 further illustrate that a panel assembly 540 further comprises an optional seal flap 592. The seal flap 592 is secured to the first end wall 558, the second side wall 554, and the second end wall 560 adjacent to the access opening 564. The seal flap 592 underlies the closure system 542 to inhibit movement of weight material 60 through the closure system 542 during normal use of the fifth example weight system 520.

The fifth example weight system 520 is of particular significance when used with the weight material assembly 530 but may also be used with loose weight material 60 (e.g., no weight material bag 62).

VI. Sixth Embodiment

Figure 24:
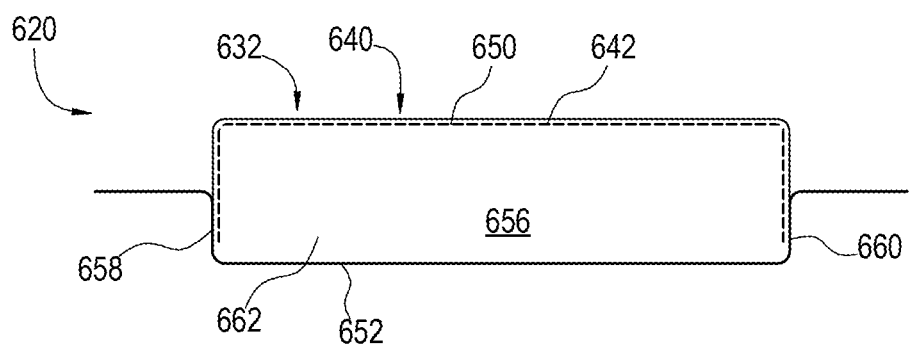
FIG. 24 is a side elevation view of a fourth example container assembly that may be used to form a weight assembly of the present invention.

Referring now to FIG. 24 of the drawing, depicted therein is a sixth example weight system 620 constructed in accordance with, and embodying, the principles of the present invention. The sixth example weight system 620 comprises a weight material assembly (not visible) and a fourth example container assembly 632. The weight material assembly is or may be the same as the example weight material assembly 50 described above.

The fourth example container assembly 632 comprises a panel assembly 640 and a closure assembly 642. The example panel assembly 640 defines an upper wall 650, a lower wall 652, a first side wall (not visible in FIG. 24), a second side wall 656, a first end wall 658, and a second end wall 660. The second side wall 656 is connected to or is integrally formed with the lower wall 652 but is disconnected from upper wall 650 and the first and second end walls 658 and 660. The second side wall 656 thus forms an access flap that is displaceable between an open position and a closed position relative to the upper wall 650, the lower wall 652, and the end walls 658 and 660. With the second side wall 656 in the closed position, the panel assembly 540 defines an interior chamber 662. With the second side wall 656 in the open position, access to the interior chamber 662 is allowed through an access opening that is covered by the upper wall 550 in the closed position.

Figure 25:
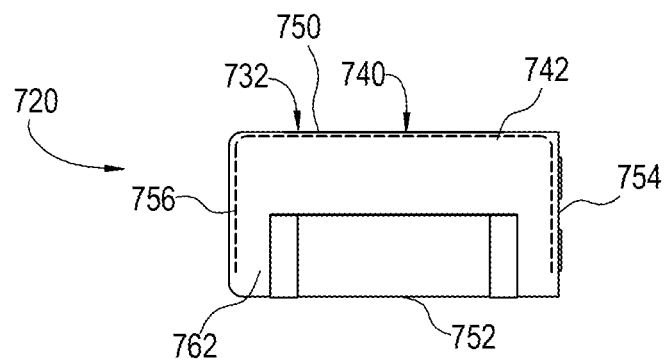
FIG. 25 is an end elevation view of a fifth example container assembly that may be used to form a weight assembly of the present invention.

Like the example closure assembly 542, the example closure assembly 642 comprises first and second closure portions (not visible in FIG. 25). The first closure portion is secured to the second side wall 656 around three sides of the access opening. The second closure portion is secured to the first end wall 658, the upper wall 650, and the second end wall 660 such that the second closure portion also extends around three sides of the access opening. The first and second closure portions are adapted to be detachably attached to each other to secure the second side wall 656 in its closed position or detached from each other to allow the second side wall 656 to be displaced between the closed position and the open position. When the closure system 642 secures the second side wall 656 in the closed position, movement of weight material 60 through the closure system 642 during normal use of the sixth example weight system 620 is inhibited.

Like the example closure assembly 542, the example closure assembly 642 is formed by a zipper assembly, but other closure systems such as hook and loop fasteners, laces, and/or buttons may be used as the example closure assembly 642. Like the upper wall 550, the second side wall 656 defines an optional overhang that covers the closure assembly 642 to inhibit movement of weight material 60 through the closure system 642 during normal use of the sixth example weight system 620.

The panel assembly 640 may further comprises an optional seal flap (not shown) to inhibit movement of weight material 60 through the closure system 642 during normal use of the sixth example weight system 620.

The sixth example weight system 620 is of particular significance when used with a weight material assembly like the weight material assembly 50 but may also be used with loose weight material (e.g., no weight material bag).

VII. Seventh Embodiment

Referring now to FIG. 25 of the drawing, depicted therein is a seventh example weight system 720 constructed in accordance with, and embodying, the principles of the present invention. The seventh example weight system 720 comprises a weight material assembly (not visible) and a fourth example container assembly 732. The weight material assembly is or may be the same as the example weight material assembly 50 described above.

The fourth example container assembly 732 comprises a panel assembly 740 and a closure assembly 742. The example panel assembly 740 defines an upper wall 750, a lower wall 752, a first side wall 754, a second side wall 756, a first end wall 758, and a second end wall (not visible in FIG. 25). The first end wall 758 is connected to or is integrally formed with the lower wall 552 but is disconnected from upper wall 750 and the first and second side walls 754 and 756. The first end wall 758 thus forms an access flap that is displaceable between an open position and a closed position relative to the upper wall 750, the lower wall 752, and the side walls 754 and 756. With the first end wall 758 in the closed position, the panel assembly 740 defines an interior chamber 762. With the first end wall 758 in the open position, access to the interior chamber 762 is allowed through an access opening that is covered by the upper wall 550 in the closed position.

Like the example closure assembly 542, the example closure assembly 742 comprises first and second closure portions (not visible in FIG. 25). The first closure portion is secured to the first end wall 758 around three sides of the access opening. The second closure portion is secured to the first side wall 754, the upper wall 750, and the second side wall 756 such that the second closure portion 772 also extends around three sides of the access opening. The first and second closure portions are adapted to be detachably attached to each other to secure the first end wall 758 in its closed position or detached from each other to allow the first end wall 758 to be displaced between the closed position and the open position. When the closure system 742 secures the first end wall 758 in the closed position, movement of weight material 70 through the closure system 742 during normal use of the seventh example weight system 720 is inhibited.

Like the example closure assembly 542, the example closure assembly 742 is formed by a zipper assembly, but other closure systems such as hook and loop fasteners, laces, and/or buttons may be used as the example closure assembly 642. The first end wall 758 defines an optional overhang that covers the closure assembly 742 to inhibit movement of weight material 70 through the closure system 742 during normal use of the seventh example weight system 720.

The panel assembly 740 may further comprises an optional seal flap (not shown) to inhibit movement of weight material through the closure system 742 during normal use of the seventh example weight system 720.

The seventh example weight system 720 is of particular significance when used with a weight material assembly like the weight material assembly 50 but may also be used with loose weight material (e.g., no weight material bag).

What is claimed is:

1. A weight system for supporting a free-standing object, comprising:
   a weight material assembly comprising weight material and a weight material bag adapted to contain the weight material, the weight material assembly having predetermined dimensions;
   a container assembly comprising
      a panel assembly defining an interior chamber, an access opening, and an access flap configured to move between
         an open position in which the interior chamber may be accessed through the access opening, and
         a closed position in which the interior chamber through the access opening is substantially prevented, and
      a closure system operable in
         an open configuration in which the access flap may be displaced between the closed and open positions, and
         a closed configuration in which the access flap is secured in the closed position; wherein
   the interior chamber is sized and dimensioned to accommodate the predetermined dimensions of the weight material assembly;
   the access opening is sized and dimensioned to allow the weight material assembly to be displaced through the access opening and into the interior chamber;
   the weight material assembly is arranged within the interior chamber;
   with the weight material assembly arranged within the interior chamber, the panel assembly is configured in the closed position and the closure system is operated in the closed configuration;
   the panel assembly comprises at least one panel defining the access opening, where the access flap is formed at least in part by the at least one panel defining the access opening; and
   the closure system comprises at least one of at least one zipper and a hook and loop fastener configured to secure the access flap relative to the at least one panel defining the access opening.

2. A weight system as recited in claim 1, in which:
   the weight material is at least one of sand and gravel; and
   the material bag comprises at least one layer configured to contain the weight material.

3. A weight system as recited in claim 2, in which the material bag comprises at least one of a paper layer and a plastic layer.

4. A weight system as recited in claim 1, in which the closure system comprises first and second zippers and a hook and loop fastener.

5. A weight system as recited in claim 4, in which:
   the panel assembly comprises first and second panels;
   the first panel defines the access opening;
   the first and second zippers are configured to secure the access flap to the first panel; and
   the hook and loop fastener is configured to secure the access flap to the second panel.

6. A weight system as recited in claim 5, in which:
the panel assembly further comprises a seal flap; and
the seal flap is arranged within the interior chamber along at least a portion of the access opening adjacent to a juncture between the first and second panels to inhibit movement of weight material out of the interior chamber through the access opening.

7. A weight system as recited in claim 1, further comprising a carrying member, in which:
the panel assembly defines at least one bottom panel; and
the carrying member is secured to the bottom panel and defines at least one handle portion to facilitate carrying of the weight system.

8. A method of supporting a free-standing object comprising the steps of:
providing a weight material assembly comprising weight material and a weight material bag adapted to contain the weight material, the weight material assembly having predetermined dimensions;
providing a container assembly comprising
a panel assembly defining an interior chamber, an access opening, and an access flap configured to move between
an open position in which the interior chamber may be accessed through the access opening, and
a closed position in which the interior chamber through the access opening is substantially prevented, and
a closure system operable in
an open configuration in which the access flap may be displaced between the closed and open positions, and
a closed configuration in which the access flap is secured in the closed position;
sizing and dimensioning the interior chamber to accommodate the predetermined dimensions of the weight material assembly;
sizing and dimensioning the access opening to allow the weight material assembly to be displaced through the access opening and into the interior chamber;
arranging the weight material assembly within the interior chamber;
with the weight material assembly arranged within the interior chamber, configuring the panel assembly in the closed position; and
operating the closure system in the closed configuration; wherein
the step of providing the panel assembly comprises the steps of providing
at least one panel defining the access opening, where the access flap is formed at least in part by the at least one panel defining the access opening; and
the closure system by configuring at least one of at least one zipper and a hook and loop fastener to secure the access flap relative to the at least one panel defining the access opening.

9. A method as recited in claim 8, in which:
the weight material is at least one of sand and gravel; and
the material bag comprises at least one layer configured to contain the weight material.

10. A method as recited in claim 9, in which the material bag comprises at least one of a paper layer and a plastic layer.

11. A method as recited in claim 8, in which the closure system comprises first and second zippers and a hook and loop fastener.

12. A method as recited in claim 11, in which:
the panel assembly comprises first and second panels;
the first panel defines the access opening;
the first and second zippers are configured to secure the access flap to the first panel; and
the hook and loop fastener is configured to secure the access flap to the second panel.

13. A method as recited in claim 12, in which:
the panel assembly further comprises a seal flap; and
the seal flap is arranged within the interior chamber along at least a portion of the access opening adjacent to a juncture between the first and second panels to inhibit movement of weight material out of the interior chamber through the access opening.

14. A method as recited in claim 8, further comprising a carrying member, in which:
the panel assembly defines at least one bottom panel; and
the carrying member is secured to the bottom panel and defines at least one handle portion to facilitate carrying of the weight system.

15. A weight system for supporting a free-standing object, comprising:
a weight material assembly comprising weight material and a weight material bag adapted to contain the weight material, the weight material assembly having predetermined dimensions;
a container assembly comprising
a panel assembly comprising first, second, third, fourth, fifth, and sixth panels configured to define an interior chamber, where the first panel is configured to define an access opening and an access flap configured to move between
an open position in which the interior chamber may be accessed through the access opening, and
a closed position in which the interior chamber through the access opening is substantially prevented, and
a closure system comprising at least one of at least one zipper and a hook and loop fastener configured to secure the access flap relative to the first panel in
an open configuration in which the access flap may be displaced between the closed and open positions, and
a closed configuration in which the access flap is secured in the closed position; wherein
the interior chamber is sized and dimensioned to accommodate the predetermined dimensions of the weight material assembly;
the access opening is sized and dimensioned to allow the weight material assembly to be displaced through the access opening and into the interior chamber;
the weight material assembly is arranged within the interior chamber; and
with the weight material assembly arranged within the interior chamber, the panel assembly is configured in the closed position and the closure system is operated in the closed configuration.

16. A weight system as recited in claim 15, in which:
the weight material is at least one of sand and gravel; and
the material bag comprises at least one layer configured to contain the weight material.

17. A weight system as recited in claim 15, in which:
the panel assembly further comprises a seal flap; and
the seal flap is arranged within the interior chamber along at least a portion of the access opening adjacent to a juncture between the first and second panels to inhibit movement of weight material out of the interior chamber through the access opening.

18. A weight system as recited in claim 1, further comprising a carrying member secured to the third panel and defines at least one handle portion to facilitate carrying of the weight system.

19. A weight system for supporting a free-standing object, comprising:
- a weight material assembly comprising weight material and a weight material bag adapted to contain the weight material, the weight material assembly having predetermined dimensions;
- a container assembly comprising
  - a panel assembly defining an interior chamber, an access opening, and an access flap configured to move between
    - an open position in which the interior chamber may be accessed through the access opening, and
    - a closed position in which the interior chamber through the access opening is substantially prevented, and
  - a closure system operable in
    - an open configuration in which the access flap may be displaced between the closed and open positions, and
    - a closed configuration in which the access flap is secured in the closed position; wherein
- the interior chamber is sized and dimensioned to accommodate the predetermined dimensions of the weight material assembly;
- the access opening is sized and dimensioned to allow the weight material assembly to be displaced through the access opening and into the interior chamber;
- the weight material assembly is arranged within the interior chamber;
- with the weight material assembly arranged within the interior chamber, the panel assembly is configured in the closed position and the closure system is operated in the closed configuration;
- the panel assembly comprises first and second panels and a seal flap;
- the first panel defines the access opening; and
- the seal flap is arranged within the interior chamber along at least a portion of the access opening to inhibit movement of weight material out of the interior chamber through the access opening.

20. A method of supporting a free-standing object comprising the steps of:
- providing a weight material assembly comprising weight material and a weight material bag adapted to contain the weight material, the weight material assembly having predetermined dimensions;
- providing a container assembly comprising
  - a panel assembly defining an interior chamber, an access opening, and an access flap configured to move between
    - an open position in which the interior chamber may be accessed through the access opening, and
    - a closed position in which the interior chamber through the access opening is substantially prevented, and
  - a closure system operable in
    - an open configuration in which the access flap may be displaced between the closed and open positions, and
    - a closed configuration in which the access flap is secured in the closed position;
- sizing and dimensioning the interior chamber to accommodate the predetermined dimensions of the weight material assembly;
- sizing and dimensioning the access opening to allow the weight material assembly to be displaced through the access opening and into the interior chamber;
- arranging the weight material assembly within the interior chamber;
- with the weight material assembly arranged within the interior chamber, configuring the panel assembly in the closed position; and
- operating the closure system in the closed configuration; wherein
- the step of providing the container assembly comprises the steps of providing a panel assembly comprising first and second panels and a seal flap, where the first panel defines the access opening; and
- the seal flap is arranged within the interior chamber along at least a portion of the access opening to inhibit movement of weight material out of the interior chamber through the access opening.

* * * * *